Sept. 13, 1927.

O. M. OTTE

HAM BOILER

Filed April 1, 1925

1,642,168

WITNESSES

INVENTOR

Patented Sept. 13, 1927.

1,642,168

UNITED STATES PATENT OFFICE.

OTHO M. OTTE, OF TARENTUM, PENNSYLVANIA, ASSIGNOR TO ALLEGHENY STEEL COMPANY, OF BRACKENRIDGE, PENNSYLVANIA, A CORPORATION OF PENNSYLVANIA.

HAM BOILER.

Application filed April 1, 1925. Serial No. 19,866.

This invention relates to cooking utensils and more particularly to ham boilers of the type used by meat packers in cooking and preparing meat for the market.

Boilers of the type set forth generally consist of a container for the meat having a lid which is telescopically received within the container and a device is provided for applying a yielding pressure to the lid to press the same down upon the meat in the container so as to compact and mold the meat during cooking in order to impress the desired form upon the finished product.

An object of this invention is to provide a boiler of the type set forth having an improved device for pressing the lid firmly into contact with the contents of the boiler.

A further object is to provide a device of the type set forth which will be simple and cheap to manufacture, easy to assemble and operate and rugged in construction.

Figure 1:
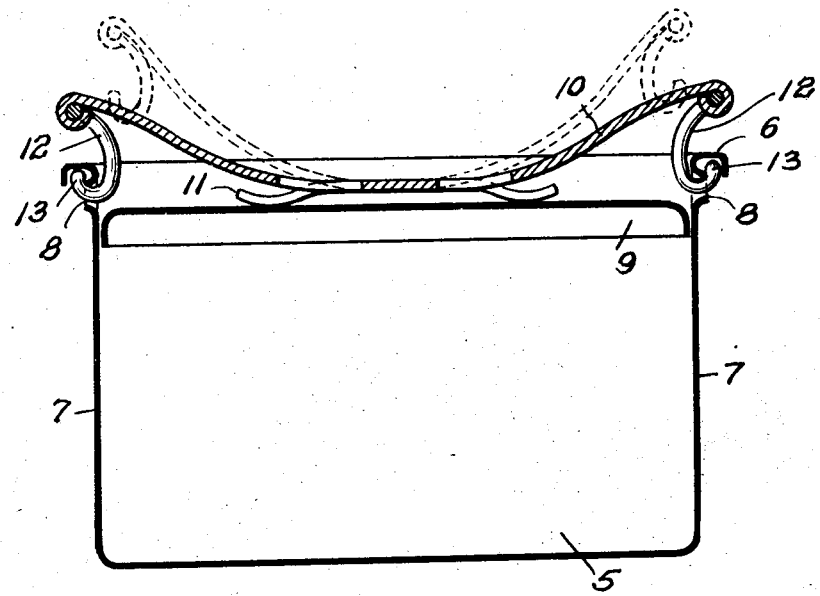
Figure 2:
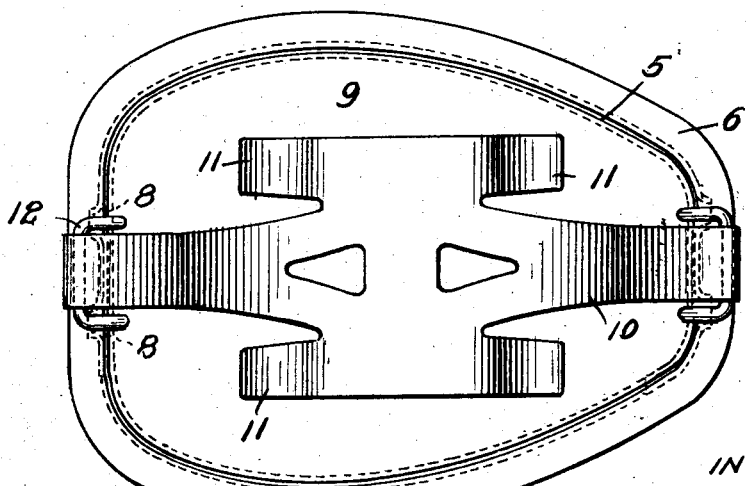

These and other objects which will appear obvious to those skilled in this particular art are attained by means of this invention, one embodiment of which is shown for the purpose of illustration in the accompanying drawing, in which Figure 1 is a transverse sectional view through the center of a boiler provided with one form of this invention, and Fig. 2 is a top plan view of the mechanism illustrated in Fig. 1.

The particular embodiment of this invention which has been chosen for the purposes of illustration includes a container 5 having the well-known, generally oval shape. The top edge of the container is bent so as to form a flange 6 and each end wall 7 is provided with spaced openings 8 near the tops thereof below the flange 6.

The usual lid 9 is telescopically received within the container, as is common with this class of boilers.

During the process of cooking, and particularly when ham trimmings are being cooked, it is necessary to force the lid 9 downwardly into contact with the contents of the container with a strong but yielding pressure so that the contents will be molded to the desired form. For this purpose I provide a curved flat spring 10 having spaced, yieldable lid engaging members 11 formed thereon which engage the lid at spaced points and which, in effect, constitute an additional spring means between the main spring 10 and the lid. Generally U-shaped links 12 are pivotally mounted in each end of the spring 10 and the end 13 of each arm on each link is curved and adapted to be inserted through the openings 8 in the end walls of the container for securing the spring in position so as to press the lid down firmly upon the contents of the container.

In operation when the container is filled the lid is placed thereon and the spring is positioned with the lid bearing members 11 in contact with the lid. The spring then assumes the position shown in dotted lines in Fig. 1. Obviously when the links are secured to the container the lid 9 is forced downwardly with a yielding pressure so as to mold and shape the contents during the process of cooking. The spring bearing members 11 apply the pressure to the lid at spaced points which are symmetrically arranged with relation thereto so that the lid is forced down equally at all points. This prevents the lid from tipping and binding in the container. The bearing members 11 are themselves yieldable and in effect form additional spring means between the spring 10 and the lid.

The container, lid, springs and links are preferably made of chromium iron alloy having a chromium content of between 9% and 21% and a carbon content under .14%. This, when the surface of the metal is treated with a solution of nitric acid, will make an article that is rustless and stainless.

What I claim as new and desire to secure by Letters Patent is:

1. A cooking utensil including in combination a container, a lid telescoping therein, a spring member having spaced bearing faces formed thereon and depending below said member for engagement with said lid and means for securing said spring to said container so that said faces force said lid into engagement with the contents of said container.

2. A cooking utensil including in combination a container, a lid telescoping therein, a spring member having two spaced outwardly extending bearing faces formed on each side thereof and depending below said member for engagement with said lid and means for securing said spring to said container so that said faces force said lid into engagement with the contents of said container.

In testimony whereof, I have hereunto subscribed my name this 30th day of March, 1925.

OTHO M. OTTE.